(12) United States Patent
Kushida et al.

(10) Patent No.: US 10,204,277 B2
(45) Date of Patent: Feb. 12, 2019

(54) ELECTRONIC DEVICE, TRAVELING LANE IDENTIFYING SYSTEM, AND TRAVELING LANE IDENTIFYING METHOD

(71) Applicant: Alpine Electronics, Inc., Tokyo (JP)

(72) Inventors: Toshio Kushida, Iwaki (JP); Tomohiro Hakozaki, Iwaki (JP); Shuichi Suto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 181 days.

(21) Appl. No.: 15/130,126

(22) Filed: Apr. 15, 2016

(65) Prior Publication Data

US 2016/0314358 A1    Oct. 27, 2016

(30) Foreign Application Priority Data

Apr. 21, 2015    (JP) .................................. 2015-086404

(51) Int. Cl.
| | | |
|---|---|---|
| *H04N 7/18* | (2006.01) | |
| *G06K 9/00* | (2006.01) | |
| *G01C 21/36* | (2006.01) | |
| *B60T 8/1755* | (2006.01) | |
| *B60W 30/12* | (2006.01) | |
| *G08G 1/16* | (2006.01) | |

(52) U.S. Cl.
CPC ...... *G06K 9/00798* (2013.01); *B60T 8/17557* (2013.01); *B60W 30/12* (2013.01); *G01C 21/3602* (2013.01); *G08G 1/167* (2013.01); *B60R 2300/804* (2013.01); *B60T 2201/08* (2013.01)

(58) Field of Classification Search
CPC .................... G06K 9/00798; G01C 21/3602

USPC .......................................................... 348/148
See application file for complete search history.

(56) References Cited

U.S. PATENT DOCUMENTS

| | | |
|---|---|---|
| 8,385,600 B2 | 2/2013 | Nara et al. |
| 2011/0320121 A1 | 12/2011 | Kang et al. |

(Continued)

FOREIGN PATENT DOCUMENTS

| | | |
|---|---|---|
| JP | 2003-035541 A | 2/2003 |
| JP | 2005-4442 | 1/2005 |

(Continued)

OTHER PUBLICATIONS

Office Action dated Oct. 30, 2018 from the corresponding Japanese application 2015-086404 with English translation.

*Primary Examiner* — Richard T Torrente
(74) *Attorney, Agent, or Firm* — Brinks Gilson & Lione

(57) ABSTRACT

An electronic device having a function of identifying a lane on which a vehicle is traveling based on imaging data includes a white line recognition unit for recognizing a white line based on imaging data taken by a rear camera, a lane width detection unit for detecting a lane width by measuring distances from the vehicle to the right white line and to the left white line, a lane change detection unit for detecting a lane change based on the detection result by the lane width detection unit, a lane number increase detection unit for detection an increase in the number of lanes based on the detection result by the lane width detection unit, and a traveling lane identifying unit for identifying a lane on which the vehicle is traveling based on the detection results of the lane width detection unit and the lane number increase detection unit.

7 Claims, 13 Drawing Sheets

(56) References Cited

U.S. PATENT DOCUMENTS

2014/0032108 A1* 1/2014 Zeng .................... G08G 1/167
                                                        701/533
2015/0367778 A1* 12/2015 Vladimerou ....... G06K 9/00798
                                                        348/148

FOREIGN PATENT DOCUMENTS

| JP | 2007-278813 A | 10/2007 |
| JP | 2008-170267 A | 7/2008 |
| JP | 2010-078387 A | 4/2010 |
| JP | 2010-221859 | 10/2010 |
| JP | 2010-281781 | 12/2010 |
| JP | 2013-181959 | 9/2013 |
| JP | 2015-069288 A | 4/2015 |
| WO | WO2004-111974 | 12/2004 |

* cited by examiner

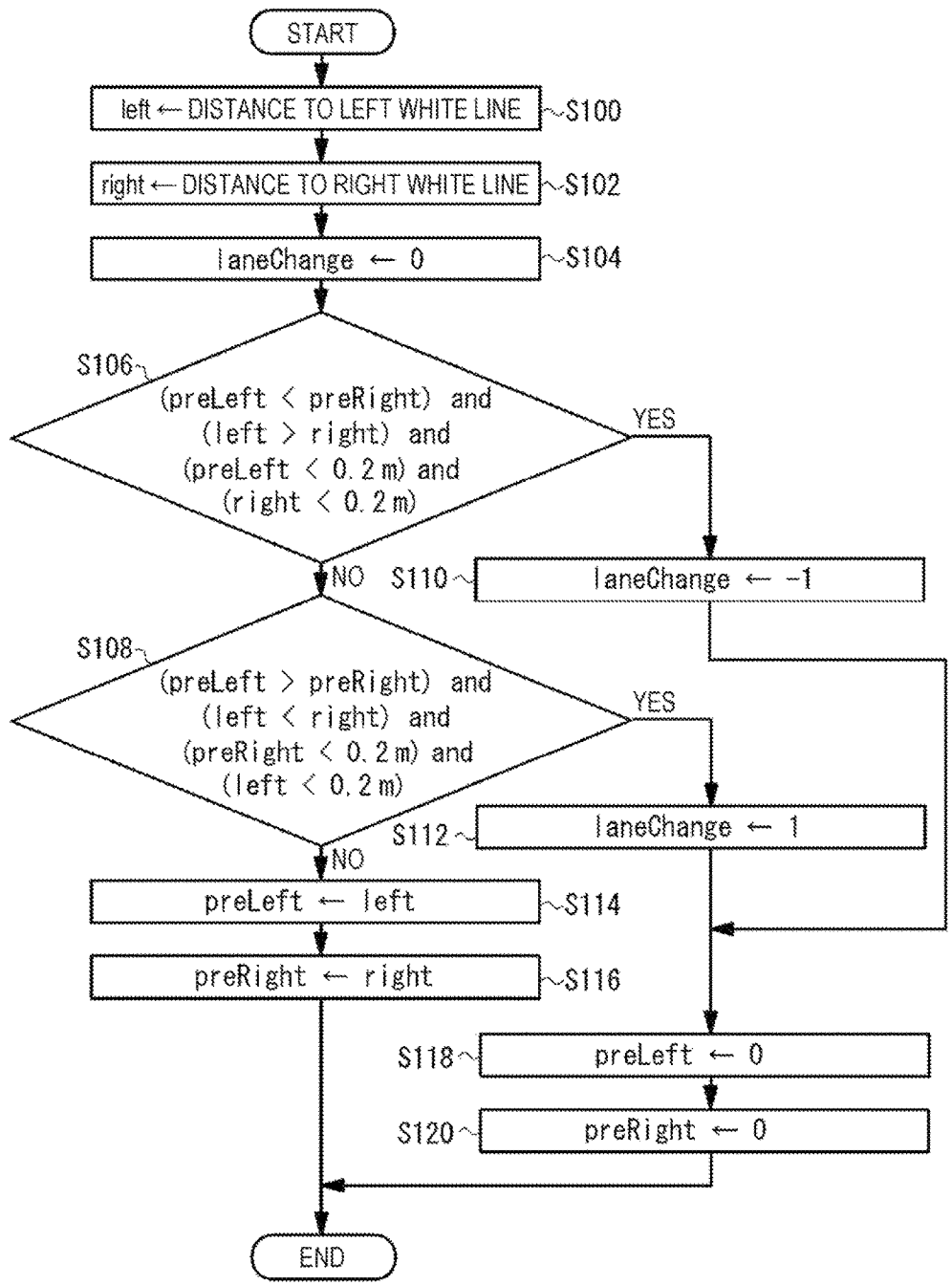

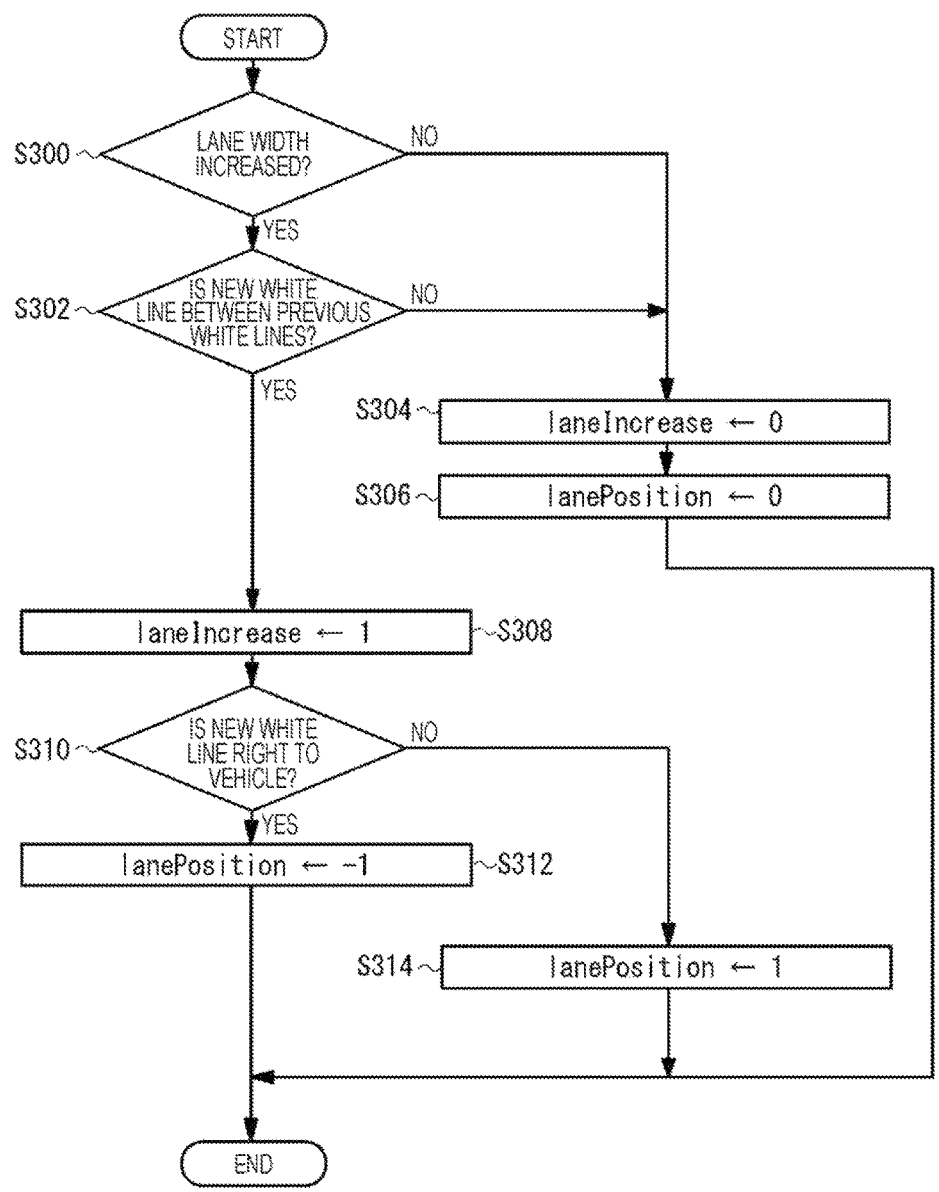

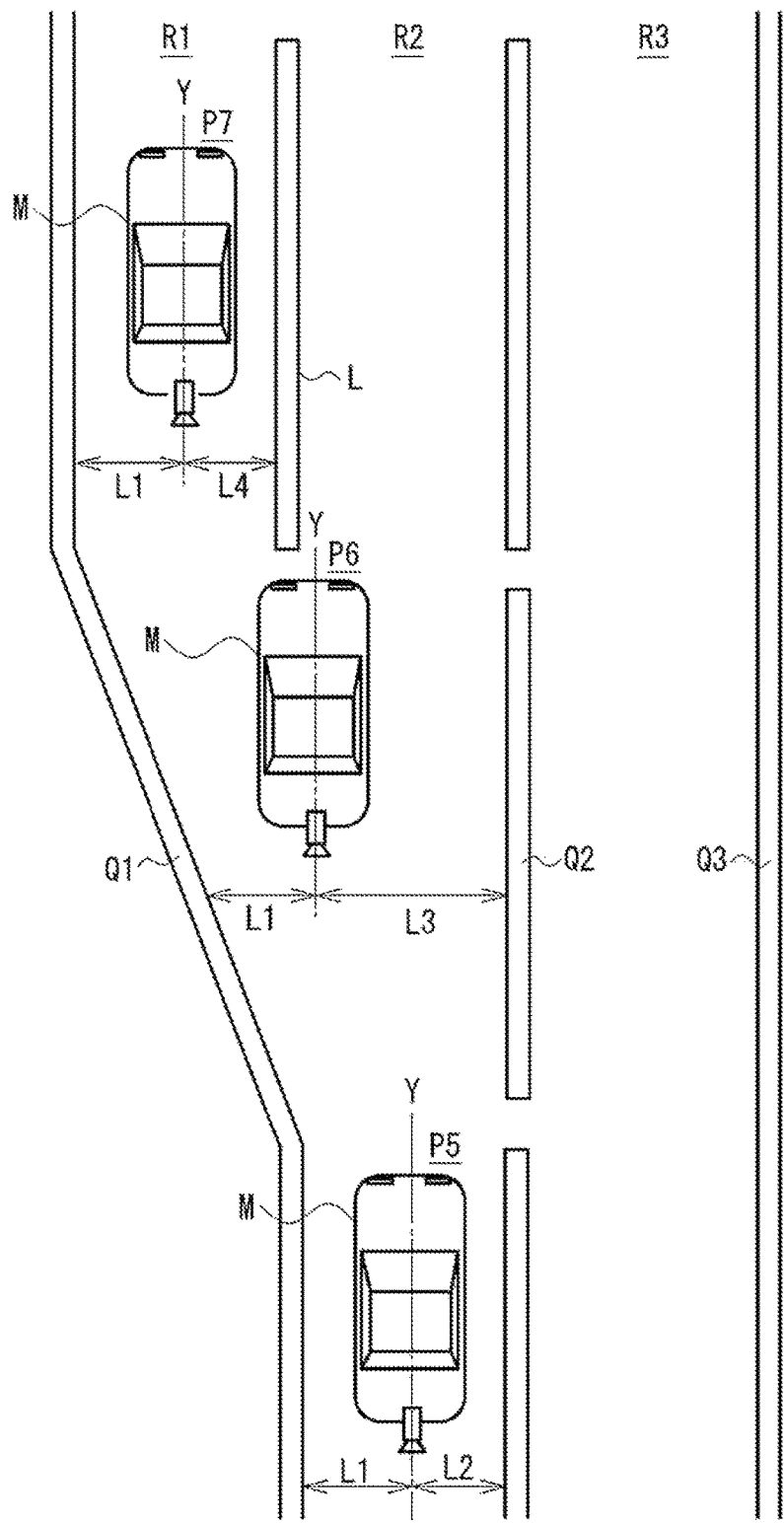

ELECTRONIC DEVICE, TRAVELING LANE IDENTIFYING SYSTEM, AND TRAVELING LANE IDENTIFYING METHOD

RELATED APPLICATIONS

The present application claims priority to Japanese Patent Application Serial Number 2015-086404, filed Apr. 21, 2015, the entirety of which is hereby incorporated by reference.

BACKGROUND

1. Field of the Invention

The present disclosure relates to a technique in which a lane is detected based on imaging data taken by a rear camera that captures an image of a rearward field of view of a vehicle and, in particular, a traveling lane selected by the vehicle is identified when the number of lanes changes.

2. Description of the Related Art

There have been systems that have imaging cameras that capture images of imaging forward, rearward, side fields of view and the like connected to a vehicle onboard unit having a navigation function and provide guidance to a driver by displaying images taken by the imaging cameras on a display or the like of the vehicle onboard unit, and such systems are widely used. In particular, an image taken by a rear camera is an image of a rearward field of view, which is the most difficult for a driver to see, and such an image allows for an easier driving operation when the driver parks the vehicle in a garage. Further, an image taken by a rear camera is useful not only from a driver's point of view but also for internal processing of various functions, such as determining a traffic state based on the image.

Techniques for detecting a lane change and/or a traveling lane by using an image of a forward field of view and/or a rearward field of view have been disclosed. Japanese Unexamined Patent Application Publication No. 2013-181959 discloses a vehicle onboard unit that recognizes left and right white lines based on an image of a forward field of view or a rearward field of view during traveling and, based on the recognized white lines and a traveling lane estimated before a boundary point of divided lanes, estimates a traveling lane after passing the boundary point of the divided lanes. Japanese Unexamined Patent Application Publication No. 2010-281781 discloses a lane change detection device that measures an inclination angle of a lane boundary line, detects a lateral move of a vehicle based on the measured inclination angle, a vehicle speed, and the like, and detects a lane change when the amount of the lateral move exceeds a predetermined distance. Japanese Unexamined Patent Application Publication No. 2010-221859 discloses a vehicle driving support device that estimates the type of a white line based on driving history information even when the type of a white line cannot be recognized due to aging, dirt, or the like. Japanese Unexamined Patent Application Publication No. 2005-4442 discloses a traveling lane determination device that extracts a predetermined area of an image and determines the type of a traveling lane based on image information included in the extracted area.

In an electronic device having a function of detecting a traveling lane based on imaging data taken by an imaging camera, a traveling lane of a vehicle is identified by an image recognition of lane demarcation lines (also, referred to as white lines) occurring in both sides of the vehicle. Further, when a vehicle moves from one lane to another, the electronic device detects the movement of lanes when the vehicle passes over a white line.

In the method of detecting a white line to detect a traveling lane of a vehicle, however, the following problems arise. When lanes are changed at a dividing point where the number of lanes increases such as at an intersection, there is a case where a lane demarcation line to be passed is out of sight of an imaging camera and thus a traveling lane of a vehicle cannot be recognized. FIG. 8 illustrates a situation where a vehicle M moves from one lane to another at a dividing point where the number of lanes increases. An imaging camera C that captures an image of a rearward field of view is mounted on a vehicle M (hereafter, referred to as M1, M2, or M3 based on a position of the vehicle illustrated in FIG. 8). When the vehicle M1 traveling on a lane R2 moves to an additional lane R1, there occurs a state where no lane demarcation line is taken by the imaging camera C for a certain period of time. That is, there is no lane demarcation line demarcating the lanes R1 and R2 at the dividing point where the lane R1 is divided from the lane R2, and thus only a white line L that is the boundary between the lane R1 and the lane R2 appears in an imaging area A2 that is taken by the imaging camera C of the vehicle M2. When the vehicle M3 fully moves to the lane R1 to travel on the lane R1, the white line L that is the boundary between the lane R1 and the lane R2 appears in an imaging area A3. In such a way, in the conventional identification of a traveling lane, since the white line L is detected after the vehicle M3 travels on the lane R1 for a while and the traveling of the vehicle M3 is identified based on the detection result, a quick identification of a traveling lane is not performed at a dividing point.

SUMMARY

Accordingly, the present disclosure addresses the problems in the conventional art as described above, and it is an object of the present disclosure to provide an electronic device, a traveling lane identifying system, and a traveling lane identifying method that enables quick identification of a traveling lane based on imaging data at a dividing point where the number of lanes increases.

An electronic device according to forms the present disclosure may include a recognition unit for recognizing a right white line and a left white line that are located on a left side and a right side of a lane, based on imaging data in which an image of a rearward field of view of a vehicle is captured; a first measuring unit for measuring a first distance between a right white line recognized by the recognition unit and the vehicle; a second measuring unit for measuring a second distance between a left white line recognized by the recognition unit and the vehicle; a detection unit for detecting a variation of at least one of the first distance and the second distance; and an identifying unit for identifying a traveling lane on which the vehicle is traveling, based on the variation detected by the detection unit.

The electronic device preferably further includes a lane number increase detection unit for detecting whether or not the number of lanes increases based on a detection result by the detection unit, and the identifying unit identifies a traveling lane based on a detection result by the lane number increase detection unit. The lane number increase detection unit preferably detects that a lane is added on a left side of a lane when a variation of the first distance detected by the detection unit is larger than a predetermined variation, and detects that a lane is added on a right side of the lane when the variation of the second distance detected by the detection unit is larger than a predetermined variation.

In some forms, when an increase in the number of lanes is detected by the lane number increase detection unit and when the variation of the first distance increases at a rate above a predetermined rate and then decreases at a rate above a predetermined rate, the identifying unit identifies that the vehicle is traveling on the lane added on the left side.

In some forms, when an increase in the number of lanes is detected by the lane number increase detection unit and when the variation of the first distance decreases at a rate above a predetermined rate, the identifying unit identifies that the vehicle is traveling on the lane added on the left side. Preferably, when an increase in the number of lanes is detected by the lane number increase detection unit and when the variation of the second distance increases at a rate above a predetermined rate and then decreases at a rate above a predetermined rate, the identifying unit identifies that the vehicle is traveling on the lane added on the right side.

In some forms, when an increase in the number of lanes is detected by the lane number increase detection unit and when the variation of the second distance decreases at a rate above a predetermined rate, the identifying unit identifies that the vehicle is traveling on the lane added on the right side. The electronic device preferably further includes an acquisition unit for acquiring information of lane division, and the identifying unit identifies a traveling lane of the vehicle based on the acquired information of lane division. The electronic device preferably further includes a map database including a plurality of lane nodes indicating a reference point of a lane and a plurality of lane links indicating a segmentation form of the lane among the plurality of lane nodes; a locating unit for determining a current location; and a map matching unit for correcting the current location determined by the locating unit on the lane links, and the map matching unit corrects the current location on the lane links corresponding to the traveling lane identified by the identifying unit.

A traveling lane identifying system includes the electronic device described above; and an imaging device for imaging a rearward field of view of a vehicle, and the electronic device receives imaging data from the imaging device and identifies a traveling lane based on the imaging data.

A traveling lane identifying method is performed by an electronic device having an imaging unit for imaging a rearward field of view of a vehicle. The method includes a recognition step for recognizing a right white line and a left white line that are located on a right side and a left side of a lane, based on imaging data taken by the imaging unit; a measuring step for measuring a first distance between the recognized right white line and the vehicle and a second distance between the recognized left white line and the vehicle; a detection step for detecting a variation of at least one of the first distance and the second distance; and an identifying step for identifying a traveling lane on which the vehicle is traveling, based on the variation detected by the detection step.

In forms of the present disclosure, left and right white lines are recognized based on imaging data by an imaging camera for imaging a rearward field of view, distances from the recognized left and right white lines to a vehicle are calculated, and a traveling lane of the vehicle is identified based on a variation of the calculated distances, so that a quicker identification of a traveling lane can be performed even when a white line is discontinuous at a dividing point where the number of lanes increases.

BRIEF DESCRIPTION OF THE DRAWINGS

FIG. 4A is a diagram illustrating an example of a process flow by a lane change detection unit;

FIG. 5A is a diagram illustrating an example of a process flow by a lane number increase detection unit;

FIG. 5B is a diagram illustrating an operation of identifying a lane on which a vehicle is traveling when the vehicle enters an additional lane at a dividing point where the number of lanes increases;

DETAILED DESCRIPTION OF THE DRAWINGS

In forms of the present disclosure, an electronic device has a function of utilizing imaging data from an imaging camera that captures an image of a rearward field of view of a vehicle to identify a traveling lane on which the vehicle is traveling. The identification result may be utilized for determining a vehicle position in a navigation function, for example. In some implementations, the electronic device can be a vehicle onboard unit mounted inside a mobile unit such as a vehicle, or a terminal unit carried in the mobile unit. In some implementations, in addition to having a navigation function, the electronic device can include various functions such as a function of playing back audio and/or video data, a function of receiving television and/or radio, and a function of data communication, for example, besides the navigation function.

Figure 1:
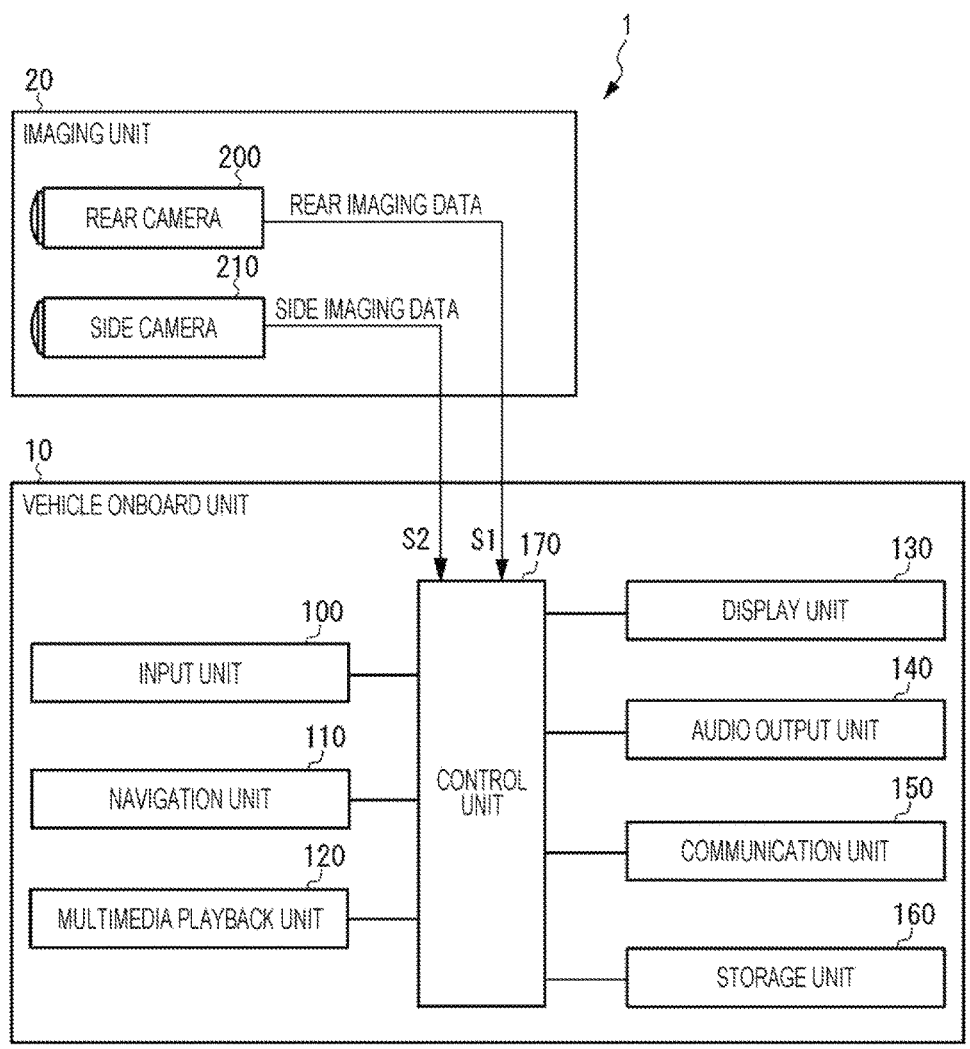
FIG. 1 is a diagram illustrating an example configuration of a traveling lane identifying system.

FIG. 1 is a diagram illustrating an example configuration of a traveling lane identifying system 1. The traveling lane identifying system 1 includes a vehicle onboard unit 10 and an imaging unit 20. The imaging unit 20 captures an image of peripheral areas around the vehicle during travel and supplies imaging data to the vehicle onboard unit 10. The vehicle onboard unit 10 performs detection and recognition of a white line, identification of a change in the number of lanes, identification of a traveling lane, and the like by analyzing images expressed by the imaging data.

The vehicle onboard unit 10 includes an input unit 100, a navigation unit 110, a multimedia playback unit 120, a display unit 130, an audio output unit 140, a communication unit 150, a storage unit 160, and a control unit 170, as illustrated in FIG. 1. Note that the configuration illustrated herein is an example and the configuration of the vehicle onboard unit 10 is not limited thereto.

The imaging unit 20 includes a rear camera 200 that capture an image of a rearward field of view of the vehicle and a side camera 210 that captures an image of a side field of view of the vehicle. Furthermore, a front camera that captures an image of a forward field of view of the vehicle may be mounted. Imaging data S1 and imaging data S2 taken by the rear camera 200 and the side camera 210, respectively, are provided to the vehicle onboard unit 10. In a preferred example, determination operations included in detecting and/or recognizing a white line, identifying a change in the number of lanes, and determining the lane on which the vehicle is traveling are performed based on the imaging data S1 taken by the rear camera 200.

The input unit 100 receives an instruction from a user via an input key device, an audio input recognition device, a touch screen, and the like and provides instructions to the control unit 170. The navigation unit 110 calculates the current location of the vehicle based on a GPS signal transmitted from a GPS satellite and a sensor output from a gyro sensor and/or an acceleration sensor mounted on the vehicle, calculates a guide path to a destination inputted from the input unit 100, and provides guidance for the calculated path and displays on the display unit 130 a road map around the position of the vehicle.

The multimedia playback unit 120 plays back video data and/or audio data stored in a storage medium such as a DVD, a CD, a Blu-Ray disk, or the like and/or in the storage unit 160. The played back video data may be displayed on the display unit 130, and the audio data may be outputted from the audio output unit 140.

The display unit 130 may include a liquid crystal display and/or other display device and, for example, may display an image of a road map generated by the navigation unit 110, display a setting window and/or a menu window for settings by a user of the vehicle onboard unit 10, and display a selection window or the like when music data to be played back by the multimedia playback unit 120 is selected. The audio output unit 140 outputs a voice guide for providing guidance for a path calculated by the navigation unit 110 and provides various voice guides to a user of the vehicle onboard unit 10.

The communication unit 150 is able to perform wireless data communications with an external network and the like. The storage unit 160 can store application software executed by the vehicle onboard unit 10, a program executed by the control unit 170, map data required when the navigation unit 110 runs, and the like. The map data preferably includes a plurality of lane nodes indicating a reference point of a lane and a plurality of lane links indicating a form of segmentation of the lane among the plurality of lane nodes. In a preferred implementation, the control unit 170 is formed of a microcontroller and the like including a ROM, a RAM, and the like, and the ROM and the RAM can store therein various programs for controlling operations of respective units of the vehicle onboard unit 10. In the present embodiment, a traveling lane identifying program 300 that determines a lane on which the vehicle is traveling is included.

Figure 2:
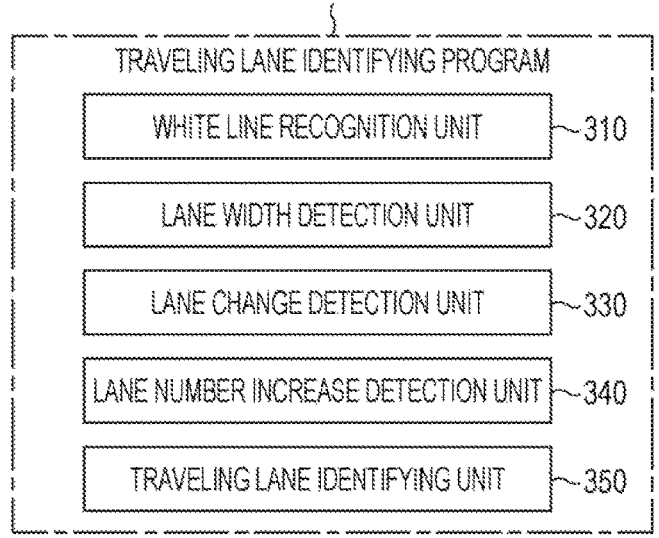
FIG. 2 is a diagram illustrating an example functional configuration of a traveling lane identifying program.

FIG. 2 is a diagram illustrating a functional example configuration of the traveling lane identifying program 300. The traveling lane identifying program 300 includes a white line recognition unit 310, a lane width detection unit 320, a lane change detection unit 330, a lane number increase detection unit 340, and a traveling lane identifying unit 350. The traveling lane identifying program 300 processes imaging data (image frame data) provided periodically from the rear camera 200 to identify a lane on which a vehicle is traveling. However, the period or interval of this process does not necessarily correspond to a period of an image frame, but detection of a traveling lane may be performed at a different constant period or interval from the period of the image frame.

The white lane recognition unit 310 analyzes an image of imaging data of a rearward field of view of the vehicle taken by the rear camera 200 and detects and recognizes a white line (a lane demarcation line) from the imaging data. The rear camera 200 is mounted on the rear center of the vehicle, for example, and captures an image of a rearward area with a constant viewing angle from the rear center. When the vehicle travels on a lane defined by a left white line and a right white line, the rear imaging data includes the left white line and the right white line. Any detection scheme of a white line may be employed, such as an edge detection for detecting an outline of a white line in the imaging data. Alternatively, it is possible to perform scanning in primary scanning line direction (horizontal direction), extract pixels having a predetermined intensity or higher, and detect a white line from the extracted pixels. Furthermore, the white line recognition unit 310 may recognize that a white line is detected when a plurality of white lines aligned at a constant interval are detected. Known other schemes than the above may be used to detect a white line. The white line recognition unit 310 detects a left white line and a right white line, which allows for recognition of the positions of the left white line and the right white line with respect to the vehicle.

The line width detection unit 320 measures a distance from the right lane to the left lane in the rear direction of the vehicle, a distance from the vehicle to the right lane, and a distance from the vehicle to the left lane in the rear side of the vehicle, based on the left and right white lines recognized by the white line recognition unit 310. Any measuring scheme may be employed. For example, when the rear camera 200 is mounted on the center of the vehicle, the number of pixels from the center of the imaging data to the left white line and the number of pixels from the center of the imaging data to the right white line are counted and thereby the distances from the center of the vehicle to the left white line and to the right white line are measured. Further, the actual imaged left white line and right white line diagonally spread rearward from the vehicle to some degrees. Thus, several measuring points in the primary scanning line direction may be set in advance, and an average value of distances measured at the points may be calculated, or distances between the left white line and the right white line at positions that are distant rearward by a predetermined distance from the vehicle may be measured.

Figure 3:
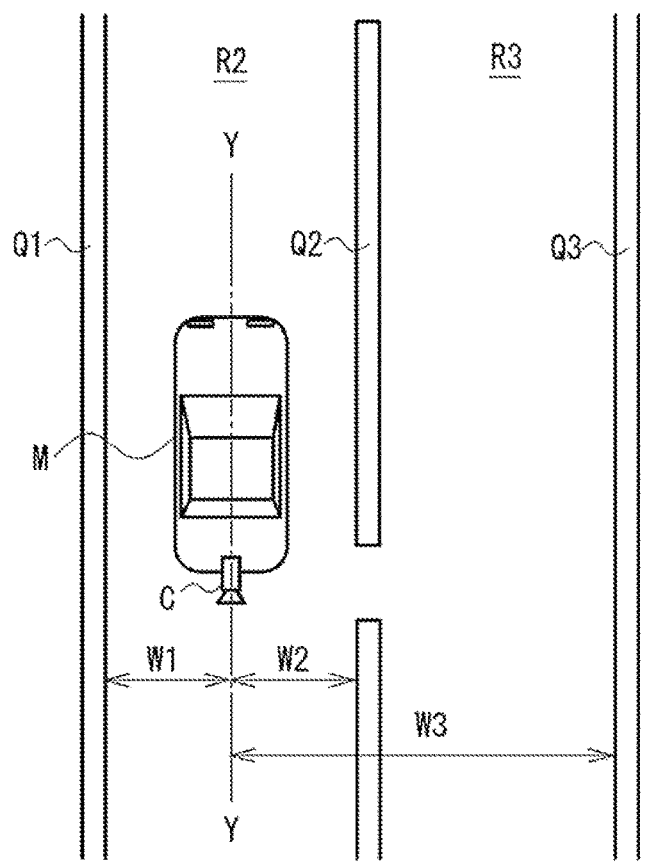
FIG. 3 is a diagram illustrating an example of a lane width measured by a lane width detection unit.

FIG. 3 is a diagram illustrating an example of a lane width detected by the lane width detection unit 320. The lane width detection unit 320 measures a width (or a distance) W1 from a center axis Y of the vehicle M to a left white line Q1 of the lane R2 and a width (or a distance) W2 from the center axis Y to a right white line Q2 of the lane R2. The lane width of the lane R2 can be derived by adding the width W1 and the width W2. Further, when an adjacent lane R3 is included in the imaging data, the lane width detection unit 320 can measure a width (or a distance) W3 from the center axis Y to a right white line Q3 of the adjacent lane R3.

The lane change detection unit 330 detects whether or not the vehicle has changed lanes. FIG. 4A is a diagram illustrating an example of a process flow of the lane change detection unit 330. A variable "left" represents a distance from the center axis Y of the vehicle M to the nearest left white line, a variable "right" represents a distance from the center axis Y of the vehicle M to the nearest right white line, a variable "preLeft" represents a distance from the center axis Y to the nearest left white line that was previously detected by the lane width detection unit 320, and a variable "preRight" represents a distance from the center axis Y to the nearest right white line that was previously detected by the lane width detection unit 320. Further, a variable "laneChange" represents a lane change, and "laneChange" is set to "−1" when it is determined that the vehicle has moved to the left lane and is set to "1" when it is determined that the vehicle has moved to the right lane. When no lane change occurs, an initial value "0" is maintained.

Figure 4B:
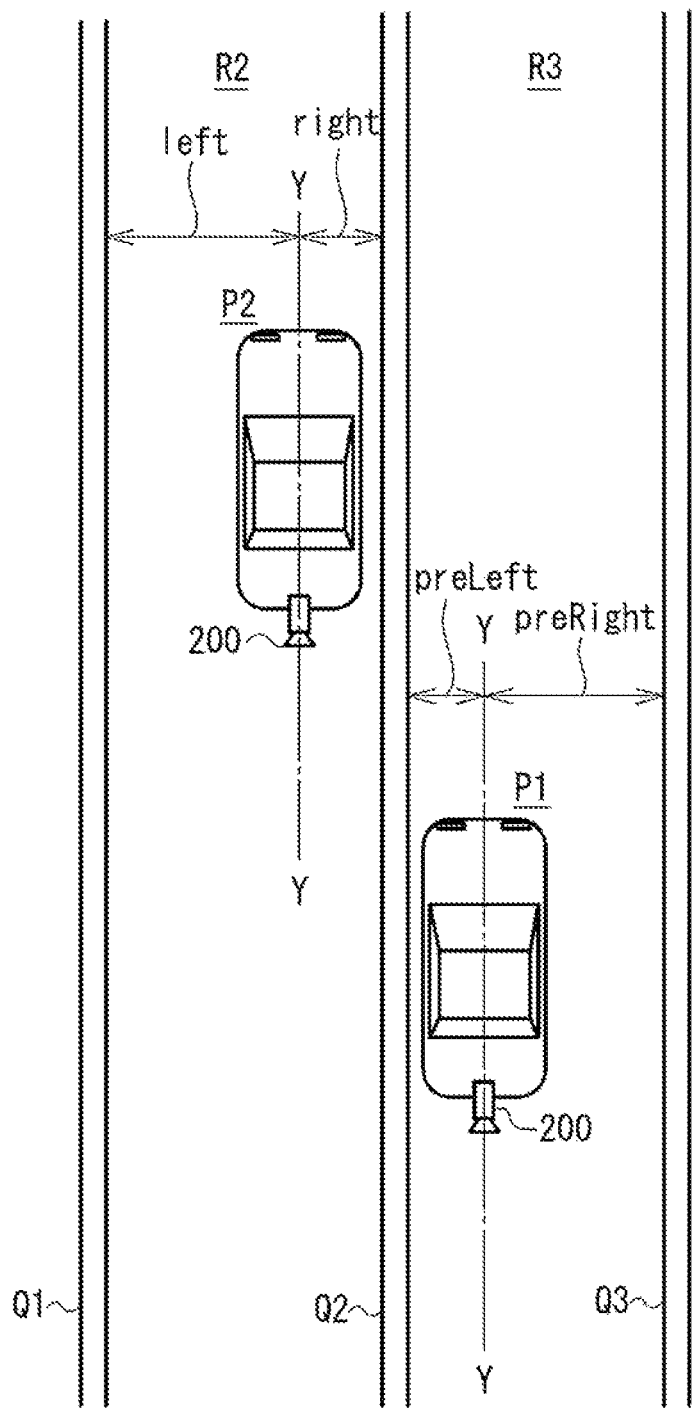
FIG. 4B is a diagram illustrating a move to a left lane.

FIG. 4B illustrates a move to the left lane, that is, from the lane R3 to the lane R2, and detection of this move will be described. When the vehicle M is at a position P2 on the lane R2, distances from the vehicle M to the right white line and the vehicle M to the left white line measured by the lane width detection unit 320 are set for "left" and "right", respectively (S100 and S102). Further, the variable "laneChange" is initialized to "0" (S104). Further, distances from the vehicle M to the left white line and from the vehicle M to the right white line when the vehicle M is at a position P1 on the lane R3 are set for "preLeft" and "preRight", respectively.

Next, the lane change detection unit 330 determines whether or not conditions indicated by step S106 are met. That is, it is determined whether or not the following conditions are satisfied: "preLeft" is smaller than "preRight", "left" is larger than "right", and, for determining that the white line Q2 is stepped over, "preLeft" and "right" are smaller than a predetermined value (0.2 m). When all these conditions are satisfied, the lane change detection unit 330 detects that the vehicle M has moved to the left lane and sets "laneChange" to "−1" (S110). After detecting the move to the left lane, "preLeft" and "preRight" are initialized (set to 0) (S118 and S120) and the process ends.

Figure 4C:
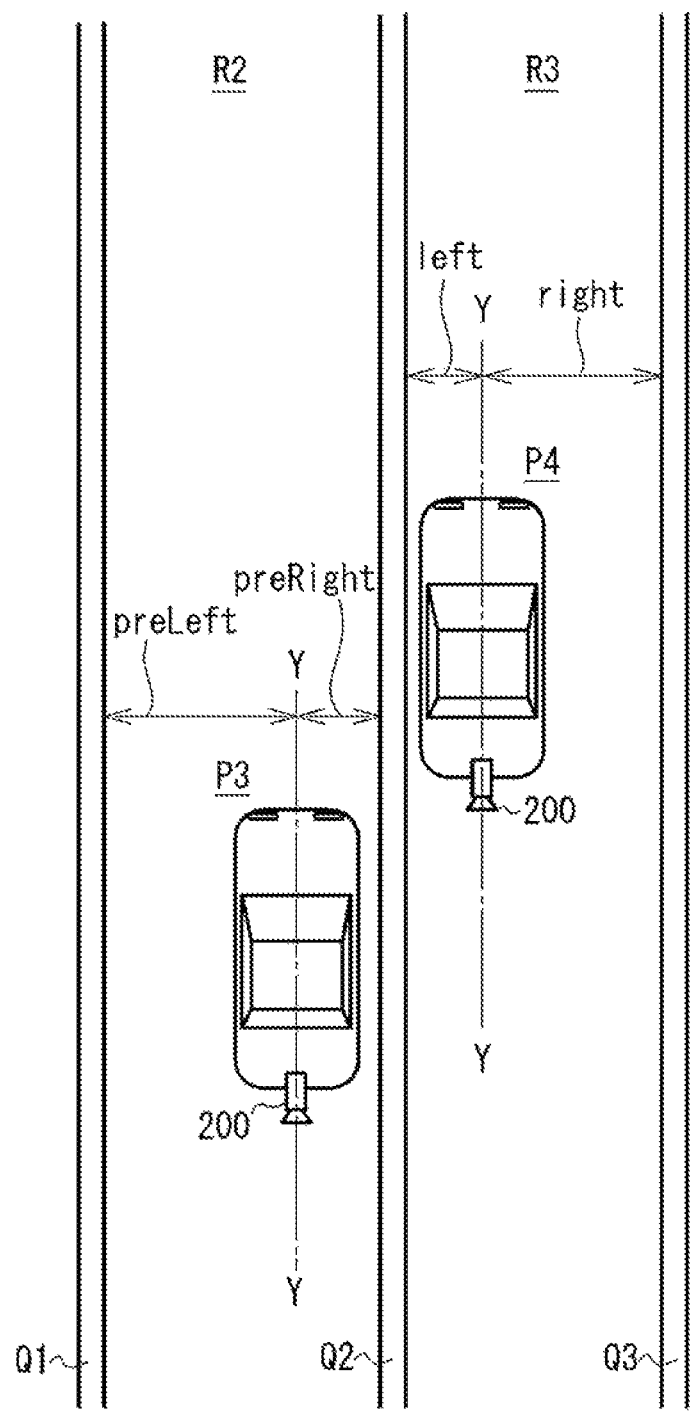
FIG. 4C is a diagram illustrating a move to a right lane.

FIG. 4C is a diagram illustrating a move to the right lane, that is, from the lane R2 to the lane R3. In this case, distances from the vehicle M to the left white line and from the vehicle M to the right white line when the vehicle M is at the position P3 on the lane R2 are set for "preLeft" and "preRight". It is determined in step S106 that the move is not a move to the left lane, and it is then determined whether or not the move is a move to the right lane (S108). That is, when "preLeft" is larger than "preRight", "left" is smaller than "right", and "preRight" and "left" are smaller than a predetermined value (0.2 m), the lane change detection unit 330 determines that the vehicle has moved to the right lane and sets "laneChange" to "1" (S112). After detecting the move to the right lane, "preLeft" and "preRight" are initialized (set to 0) (S118 and S120) and the process ends.

Figure 4D:
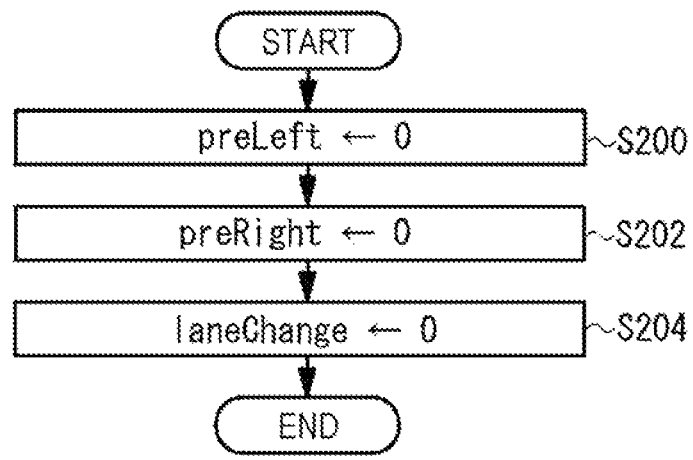
FIG. 4D is a diagram illustrating an initialization process of the lane change detection unit.

As illustrated in the flow of FIG. 4A, when there is no move to the right lane or to the left lane, the values of "left" and "right" are set to "preLeft" and "preRight" (S114 and S116) and will be used for a process in again determining whether or not the vehicle has changed lanes. Note that, in performing the process of FIG. 4A, the initialization process illustrated in FIG. 4D is performed in advance. Since the initialization process is to initialize "preLeft" and "preRight" (set to 0), however, the initialization of FIG. 4D is preferably performed at the first round only of FIG. 4A.

Figure 8:
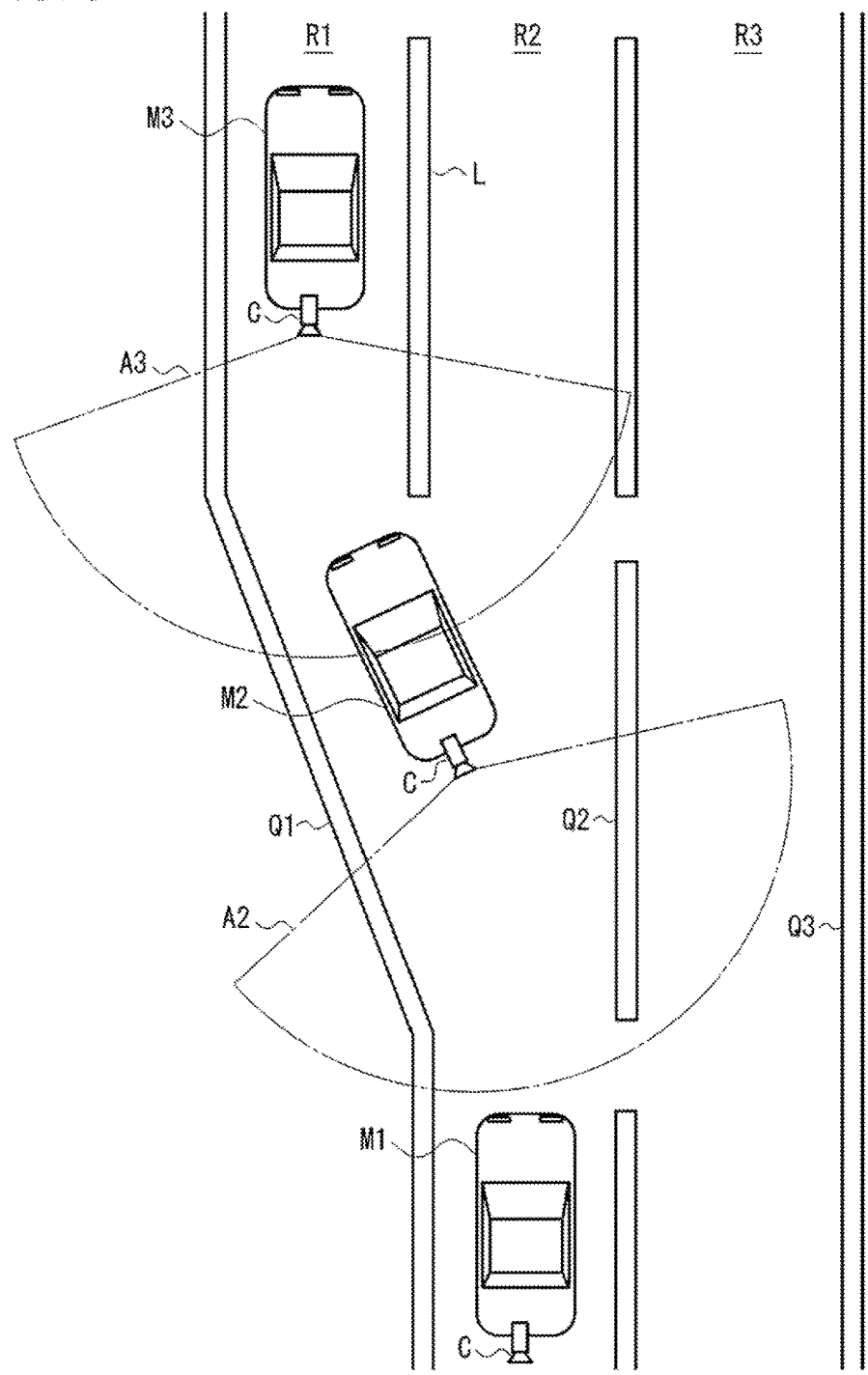
FIG. 8 is a diagram illustrating a situation in which a lane change is performed while no white line is captured by an imaging camera provided to a vehicle for imaging a rearward field of view.

The lane number increase detection unit 340 detects an increase in the number of lanes based on the recognition result by the white line recognition unit 310 and the detection result by the lane width detection unit 320. The lane number increase detection unit 340 typically detects an increase in the number of lanes when an absolute value or a variation of the lane width (a total distance W1+W2 of FIG. 3) changes to a great degree or when the number of white lines recognized by the white line recognition unit 310 increases. As illustrated in FIG. 8, however, when the lane R1 is divided from the lane R2, there may be no white line in the boundary between the lane R1 and the lane R2. When the vehicle M travels on the lane R2, the distance from the vehicle M to the left white line Q1 will change to a great degree at the boundary. In contrast, when the vehicle M travels in a direction entering the lane R1, the distance from the vehicle M to the right white line Q2 will change to a great degree. That is, even when there is no white line in the dividing area in a road having divided lanes where the number of lanes increases, an increase in the number of lanes can be determined when a variation or a rate of change of the lane width from the left white line Q1 to the right white line Q2 becomes larger than a certain value. Furthermore, by detecting that either the distance from the vehicle to the left white line or the distance from the vehicle to the right white line changes to a great degree, it can be determined that the number of lanes has increased on the side where the change is larger. Further, as illustrated in FIG. 8, the white line Q1 inclines in a left oblique direction at the boundary where the lane R1 occurs in the left side. Therefore, when the angle of the inclination direction of the white line recognized by the white line recognition unit 310 exceeds a predetermined angle, the lane number increase detection unit 340 can determine that an increase of the lane has occurred in a particular direction, so that the determination accuracy is improved. Furthermore, when information of the number of lanes is included in the road map data of the navigation unit 110, the information of the number of lanes may be utilized for the determination or, when information of the number of lanes can be obtained from a roadside unit, such information may be utilized.

FIG. 5A is a diagram illustrating an example of a process flow of the lane number increase detection unit 340. As used herein, "laneIncrease" is a variable representing an increase in the number of lanes and it is set to "0" when there is no increase in the number of lanes while set to "1" when an increase in the number of lanes is detected. Further, "lanePosition" is a variable representing a traveling lane of the vehicle when the number of lanes increases and it is set to "−1" when the vehicle is traveling on the left lane of the divided lanes while set to "1" when the vehicle is traveling on the right lane of the divided lanes.

The lane number increase detection unit 340 detects whether or not the lane width detected by the lane width detection unit 320 increases (S300). Whether or not the lane width increases is determined by the comparison of the previously measured lane width to the currently measured lane width as described above. When it is determined that the lane width has not added, "laneIncrease" and "lanePosition" are set to "0" (S304 and S306) and the process ends.

On the other hand, when it is determined that the lane width has increased, it is then determined whether or not there is a new white line between the latest detected left and right white lines (S302). The new white line refers to a white line such as the white line L located between the lane R1 and the lane R2 shown in FIG. 8. Whether or not there is a new white line is determined based on the recognition result by the white line recognition unit 310. When a new white line is not detected, the lane number increase detection unit 340 sets "laneIncrease" and "lanePosition" to "0" (S304 and S306) and the process ends. When a new white line is detected, it is determined that the number of lanes has increased and "laneIncrease" is set to "1" (S308). Furthermore, it is determined whether the new white line is in the left side of the vehicle or in the right side of the vehicle (S310), "lanePosition" is set to "−1" when the new white line is in the right side (S312), while "lanePosition" is set to "1" when the new white line is in the left side (S314), and then the process ends.

The traveling lane identifying unit 350 identifies a lane on which the vehicle is traveling, based on the detection results by the lane change detection unit 330, the lane number increase detection unit 340, and the like. The identification result of the traveling lane identifying unit 350 is utilized for information for a driving assist that notifies a driver of an obstacle from the rear side, position information of the navigation unit 110, or the like.

Next, an identifying operation of a traveling lane of the present embodiment will be described in detail. FIG. 5B is a diagram for illustrating an operation of identifying a lane on which a vehicle is traveling when the vehicle enters an additional lane at a dividing point where the number of lanes increases. The vehicle M moves from a position P5 to a position P6 and then a position P7 and moves from the lane R2 to the additional lane R1. In such a case of traveling, a distance L1 from the vehicle M to the nearest left white line Q1 is substantially constant at the positions P5, P6, and P7 or changes by little variation. On the other hand, a distance L2 from the vehicle M to the nearest right white line Q2 increases sharply to a distance L3 at the position P6 (L3 is larger than L2). This is because there is no white line indicating a boundary between the lane R1 and the lane R2 at the dividing point and the distance L3 to the white line Q2 is measured without any white line being taken by the rear camera 200.

In one implementation, when the total distance L1+L3 exceeds a certain value due to the move from the position P5 to the position P6, the lane number increase detection unit 340 determines that the number of lanes increases. Furthermore, when the inclination angle of the left white line Q1 exceeds a certain angle in the left side due to the move from the position P5 to the position P6, the lane number increase detection unit 340 determines that a lane is divided and added on the left side. Based on the detection result by the lane number increase detection unit 340, the traveling lane identifying unit 350 compares the distance L1 to the distance L3 at the position P5, and estimates that the vehicle enters the additional lane R1 when L1 is smaller than L3, while estimates that the vehicle enters the lane R2 when L1 is larger than L3. This estimation result can be utilized in setting "lanePosition" to "1" or "−1" at steps S304 and S306 without waiting for a detection of a new white line L in the flow of FIG. 5A, for example. This can reduce the time required to identify a lane on which the vehicle is traveling.

In a further implementation, the traveling lane identifying unit 350 can additionally use lane widths L1 and L4 at the position P7 for the determination. Once the vehicle M has entered the lane R1 and a white line L is captured, a distance L4 from the vehicle M to the white line L is measured. The distance L4 decreases more sharply than the distance L3 resulting in so a large variation. On the other hand, in the move from the position P6 to the position P7, the variation of the distance L1 is small. That is, when the distance L2 increases to the distance L3 and the distance L3 decreases to distance L4, the traveling lane identifying unit 350 can determine that the vehicle travels on the additional lane R1.

Figure 5C:
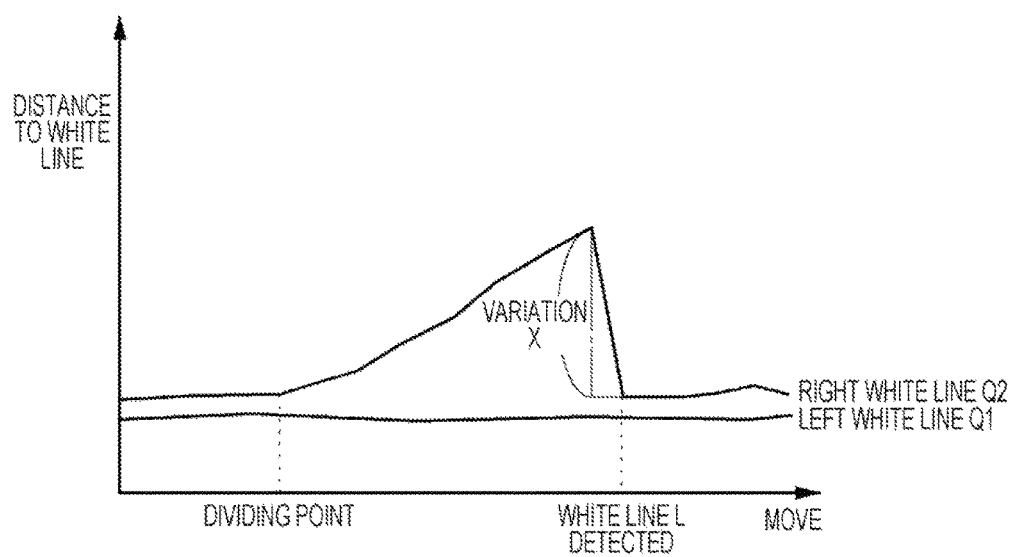
FIG. 5C is a diagram schematically illustrating a variation of distances from a vehicle to a left white line and from the vehicle to a right white line when a vehicle moves to a left lane.

FIG. 5C is a diagram schematically illustrating a change in the distances from the vehicle to the left white line Q1 and to the right white line Q2 when the vehicle moves from the lane R2 to the lane R1. The distance L1 from the vehicle to the right white line and the distance L2 from the vehicle to the left white line are substantially constant before the dividing point. When the vehicle M starts entering the dividing area (entering the lane R1), however, the distance L2 to the right white line increases and then falls sharply by the maximum variation X at the time of detection of the white line L. The lane number increase detection unit 340 may detect an increase of the number of lanes when some variation exceeds a certain value or its absolute value exceeds a certain value, and may detect the side on which the lane is added, by comparison of the variation or its absolute value of the distance to the left white line with the distance to the right white line. Furthermore, the traveling lane identifying unit 350 can identify whether the vehicle is traveling on the additional lane or the non-additional lane based on a change in which a variation of the distance to the right white line Q2 increases and then decreases or based on a change in which a decrease or a variation of the distance from the maximum variation X exceeds a certain value.

Figure 5D:
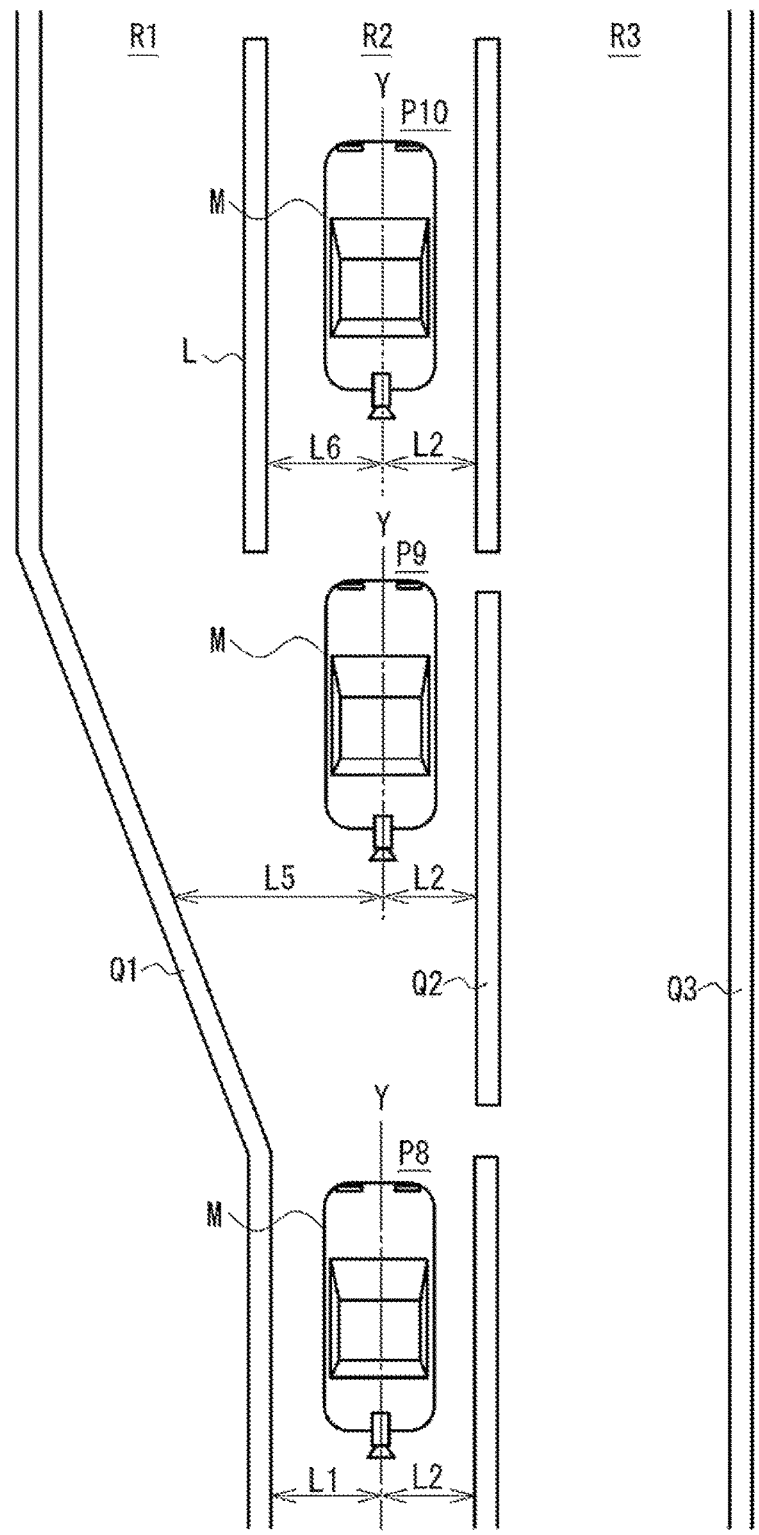
FIG. 5D is a diagram illustrating an operation of identifying a lane on which a vehicle is traveling when the vehicle enters a non-additional lane at a dividing point where the number of lanes increases.

FIG. 5D is a diagram illustrating an operation of identifying a lane on which the vehicle is traveling when the vehicle does not enter the additional lane at the dividing point where the number of lanes increases. The vehicle M moves from a position P8 to a position P9 and then a position P10 and travels straight on the lane R2 passing through the dividing point. In such a case, the distance L2 between the vehicle M and the nearest right white line Q2 is substantially constant at the positions P8, P9, and P10 or changes by little variation. On the other hand, the distance L1 from the vehicle M to the nearest right white line Q1 increases sharply to a distance L5 at the position P9 (L5 is larger than L1). This is because there is no white line indicating a boundary between the lane R1 and the lane R2 at the dividing point and the distance L5 to the white line Q1 is measured without any white line being taken by the rear camera 200. In this case, the same process and determination as illustrated in FIG. 5B will be performed.

Figure 6:
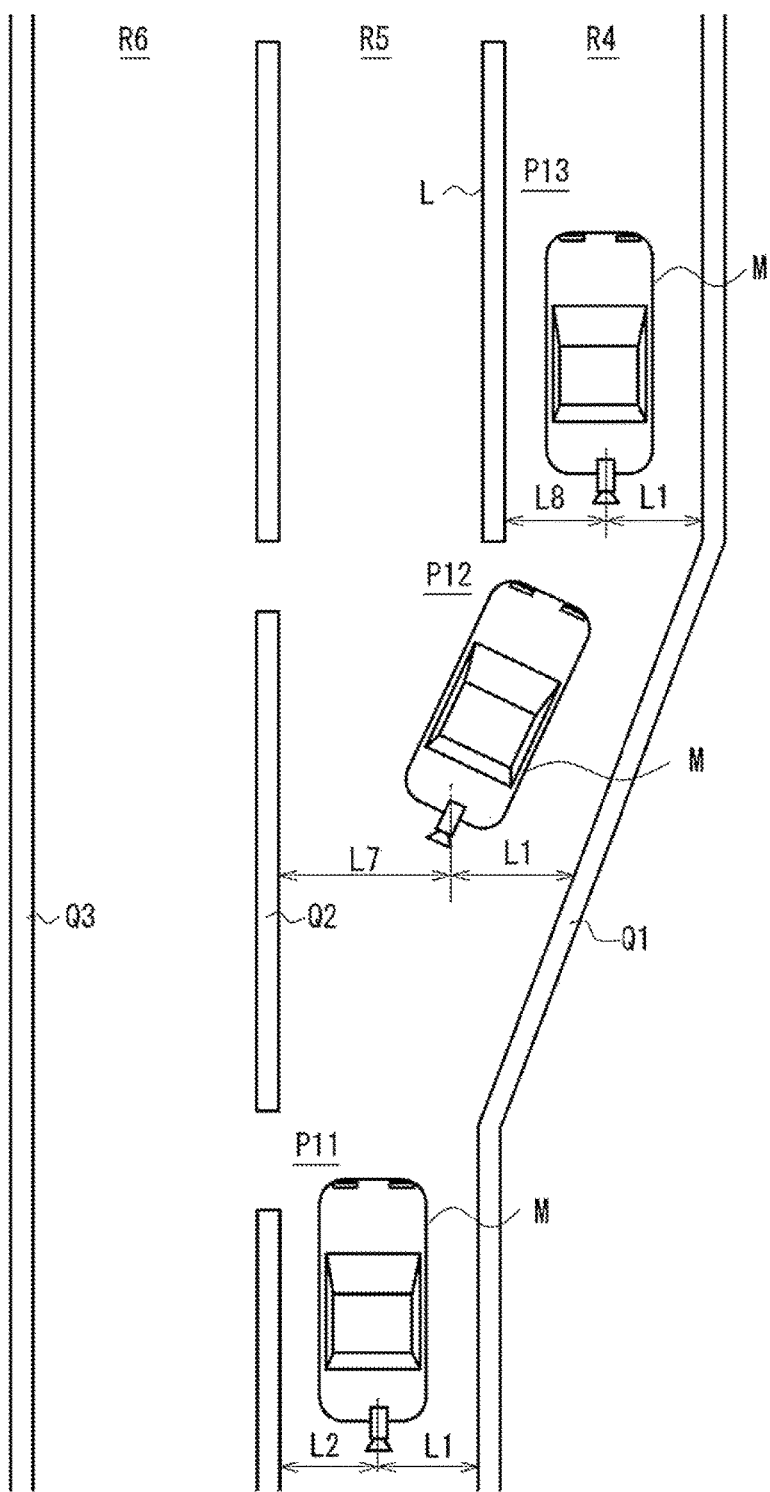
FIG. 6 is a diagram illustrating an identification of a lane on which a vehicle is traveling when the vehicle travels on an additional lane where the number of lanes increases in the right side.

FIG. 6 is a diagram illustrating identification of a traveling lane at the dividing point where the number of lanes increases in the right side. As illustrated in FIG. 6, a lane R4 is newly added on the right side and the vehicle M moves through positions P11, P12, and P13. When the vehicle passes through the position P12, a variation or its absolute value of a lane width (L1+L2) between the right white line Q1 and the left white line Q2 exceeds a certain value and thereby the increase of the number of lanes is detected. Further, the right white line Q1 inclines to the right side and thereby the addition of the lane R4 in the right side is detected. Furthermore, based on a change in the distance L1 between the vehicle M and the right white line Q1 and a change in the distance L2 between the vehicle M and the left white line Q2 at the positions P11, P12, and P13, the traveling lane identifying unit 350 identifies which of the lane R4 or the lane R5 the vehicle M enters at the dividing point.

Figure 7:
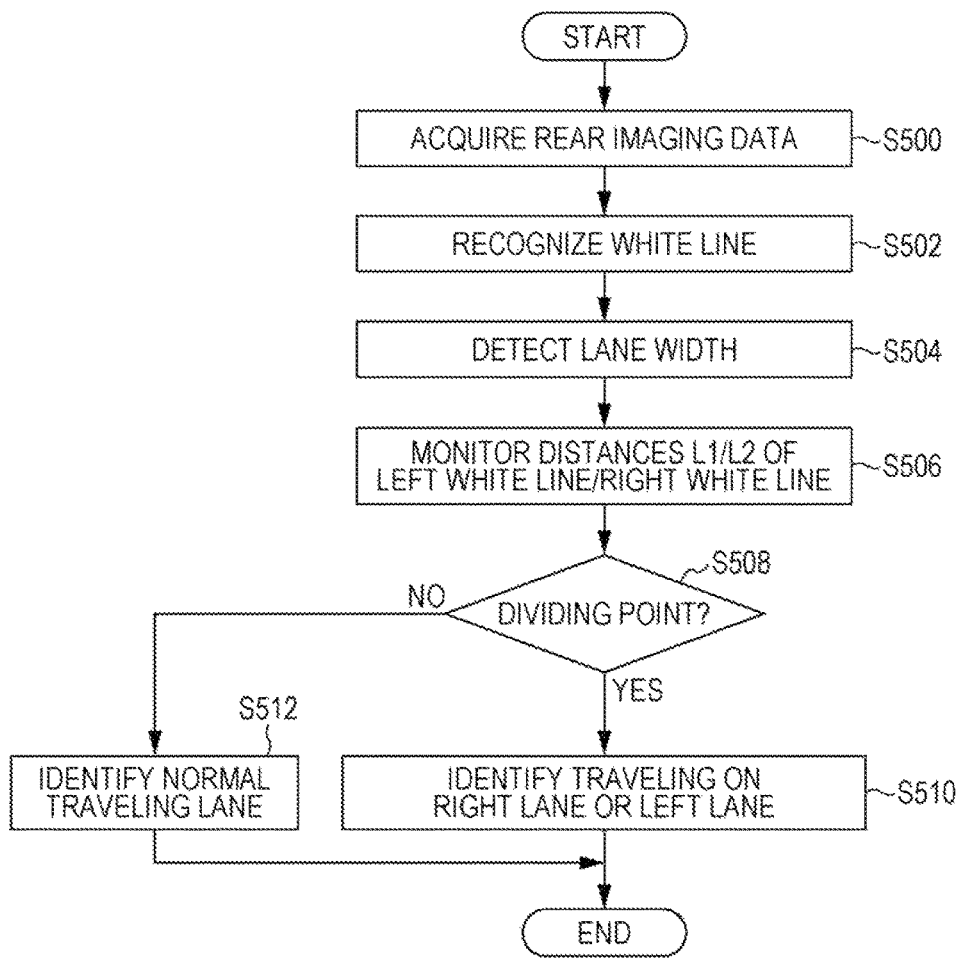
FIG. 7 is a diagram illustrating a process flow of the traveling lane identifying program.

FIG. 7 is a diagram illustrating a process flow of the traveling lane identifying program 300. Upon startup of the traveling lane identifying program 300, the lane change detection unit 330 and the lane number increase detection unit 340 are initialized, if necessary. Next, imaging data taken by the rear camera 200 is acquired (S500), and a white line is recognized from the imaging data acquired by the white line recognition unit 310 (S502). Once a white line is recognized by the white line recognition unit 310, the lane width detection unit 320 measures the distance L1 from the vehicle to the left white line Q1 and the distance L2 from the vehicle to the right white line Q2 to detect the lane width (S504). The processes from step S504 to step S508 are continuously repeated during imaging data from the rear camera 200 being provided. Once the distances L1 and L2 are measured, the lane change detection unit 330 and the lane number increase detection unit 340 monitor the distances L1 and L2 (S506), and the traveling lane identifying unit 350 estimates the dividing point based on the monitoring result (S508). When a new white line is not recognized despite the fact that the increase in the number of lanes has been detected, the traveling lane identifying unit 350 estimates that there is a dividing point where the number of lanes increases (S508). Once the dividing point is estimated, the traveling lane identifying unit 350 identifies whether the vehicle is traveling on the additional lane or the non-additional lane (S510), as described with respect to FIG. 5B, FIG. 5D, and FIG. 6. When no dividing point is estimated, a traveling lane is identified by the usual process as illustrated in FIG. 4A and FIG. 5A (S512).

In the conventional art, a lane change is detected when a white line L is stepped over. In contrast, the present embodiment enables identification of an increase in the number of lanes and a traveling lane based on a variation of the lane width and/or an inclination of the white line without detecting the stepping over of the white line L. Therefore, a traveling lane can be identified in a dividing area and the like where there is no white line but the number of lanes increases. As a result, this allows for quicker and easier identification of a traveling lane at the time when a white line is recognized after a dividing point is passed. Further, in the present embodiment, a traveling lane can be identified by using imaging data only from a rear camera without using a road map data or a vehicle positioning data such as from a GPS or a self-contained navigation sensor.

Although the example in which a white line is recognized and a traveling lane is identified from imaging data from the rear camera 200 is provided in the embodiment described above, a plurality of imaging data may be utilized when a plurality of rear cameras is mounted on the vehicle. Furthermore, the camera that captures an image of a rearward field of view of the vehicle may be a side view camera mounted on the side of the vehicle.

Furthermore, although a traveling lane is identified at a dividing point where the number of lanes increases by using imaging data only in the embodiment described above, other information such as road map data of the navigation unit may be utilized for further improving accuracy. For example, when there is an intersection at which the number of lanes increases ahead of a road on which the vehicle is traveling, an increase in the number of lanes may be determined from a map data in response to the vehicle's position entering the intersection, and a detection based on an absolute value or a variation of the lane width may be cancelled. In this case, the traveling lane identifying unit compares the distance L1 from the vehicle to the left white line with the distance L2 to the right white line, and identifies that the vehicle enters the lane with the smaller distance.

Furthermore, a use of the forms described above may include an example in which the identification result of the traveling lane is utilized in a map matching process. For example, when the current location of the vehicle is calculated from a GPS signal and the like by the navigation unit 110, an error when the current location is calculated by the navigation unit 110 can be corrected by identifying a lane on which the vehicle is traveling of the vehicle according to the process of the embodiment described above and by applying a map matching of the current location of the vehicle calculated by the GPS signal and the like to the identified traveling lane. It is possible to apply the map matching by correcting the current location of the vehicle to a lane link that indicates a form of segmentation of the lanes stored in the storage unit 160.

As described above, while forms of the present disclosure have been described in detail, the present invention is not limited to a particular embodiment, but various modifications and variations are possible within the scope and spirit of the invention recited in the appended claims.

It is therefore intended that the foregoing detailed description be regarded as illustrative rather than limiting, and that it be understood that it is the following claims, including all equivalents, that are intended to define the spirit and scope of this invention.

What is claimed is:
1. An electronic device comprising:
a hardware control unit configured to execute instructions stored in the storage unit and act as:
    a recognition unit configured to recognize a right white line and a left white line that are located on a left side and a right side of a lane, based on imaging data in which an image of a rearward field of view of a vehicle is captured;
    a first measuring unit configured to measure a first distance between a right white line recognized by the recognition unit and the vehicle;
    a second measuring unit configured to measure a second distance between a left white line recognized by the recognition unit and the vehicle;
    a detection unit configured to detect a variation of at least one of the first distance and the second distance;
    a lane number increase detection unit configured to detect whether or not a number of lanes increases based on a detection result by the detection unit; and
    an identifying unit configured to identify a traveling lane on which the vehicle is traveling, based on the variation detected by the detection unit and a detection result by the lane number increase detection unit;
wherein the lane number increase detection unit is configured to detect that a lane is added on a left side of a lane when a variation of the first distance detected by the detection unit is larger than a predetermined variation, and is configured to detect that a lane is added on a right side of the lane when the variation of the second distance detected by the detection unit is larger than a predetermined variation;
wherein, when an increase in the number of lanes is detected by the lane number increase detection unit and when the variation of the first distance increases at a rate above a predetermined rate and then decreases at a rate above a predetermined rate, the identifying unit is configured to identify that the vehicle is traveling on the lane added on the left side; and
wherein, when an increase in the number of lanes is detected by the lane number increase detection unit and when the variation of the second distance increases at a rate above a predetermined rate and then decreases at a rate above a predetermined rate, the identifying unit is configured to identify that the vehicle is traveling on the lane added on the right side.

2. The electronic device according to claim 1, wherein, when an increase in the number of lanes is detected by the lane number increase detection unit and when the variation of the first distance decreases at a rate above a predetermined rate, the identifying unit is configured to identify that the vehicle is traveling on the lane added on the left side.

3. The electronic device according to claim 1, wherein, when an increase in the number of lanes is detected by the lane number increase detection unit and when the variation of the second distance decreases at a rate above a predetermined rate, the identifying unit is configured to identify that the vehicle is traveling on the lane added on the right side.

4. The electronic device according to claim 1, wherein the hardware control unit is further configured to act as an acquisition unit configured to acquire information of lane division, wherein the identifying unit is configured to identify a traveling lane of the vehicle based on the acquired information of lane division.

5. The electronic device according to claim 1, further comprising:
a map database including a plurality of lane nodes indicating a reference point of a lane and a plurality of lane links indicating a form of segmentation of the lane among the plurality of lane nodes; and
a locating unit configured to determine a current location;
wherein the hardware control unit is further configured to acts as a map matching unit configured to:
correct the current location determined by the locating unit on the lane links, and
correct the current location on the lane links corresponding to the traveling lane identified by the identifying unit.

6. A traveling lane identifying system comprising:
the electronic device according to claim 1; and
an imaging device configured to image a rearward field of view of a vehicle,
wherein the electronic device is configured to receive imaging data from the imaging device and to identify a traveling lane based on the imaging data.

7. A traveling lane identifying method performed by an electronic device having an imaging unit for imaging a rearward field of view of a vehicle, the method comprising:

a recognition step for recognizing, with a hardware control unit of the electronic device, a right white line and a left white line that are located on a right side and a left side of a lane, based on imaging data taken by the imaging unit;
a measuring step for measuring, with the hardware control unit, a first distance between the recognized right white line and the vehicle and a second distance between the recognized left white line and the vehicle;
a detection step for detecting, with the hardware control unit, a variation of at least one of the first distance and the second distance;
a lane number increase detection step for detecting, with the hardware control unit, whether or not a number of lanes increases based on the detected result of the variation of at least one of the first distance and the second distance; and
an identifying step for identifying, with the hardware control unit, a traveling lane on which the vehicle is traveling, based on the variation detected by the detection step and a detection result by the land number increase detection step;
wherein the hardware control unit detects that a lane is added on a left side of a lane when a variation of the first distance detected by the lane number increase detection step is larger than a predetermined variation, and detects that a lane is added on a right side of the lane when the variation of the second distance detected by the lane number increase detection step is larger than a predetermined variation;
wherein, when an increase in the number of lanes is detected by the lane number increase detection step and when the variation of the first distance increases at a rate above a predetermined rate and then decreases at a rate above a predetermined rate, the hardware control unit identifies that the vehicle is traveling on the lane added on the left side; and
wherein, when an increase in the number of lanes is detected by the lane number increase detection step and when the variation of the second distance increases at a rate above a predetermined rate and then decreases at a rate above a predetermined rate, the hardware control unit identifies that the vehicle is traveling on the lane added on the right side.

* * * * *